United States Patent

[11] 3,548,786

| [72] | Inventor | Allan H. Willinger<br>New Rochelle, N.Y. |
|---|---|---|
| [21] | Appl. No. | 762,738 |
| [22] | Filed | Sept. 26, 1968 |
| [45] | Patented | Dec. 22, 1970 |
| [73] | Assignee | Metaframe Corporation<br>a corporation of Delaware |

[54] AQUARIUM WATER WHEEL
3 Claims, 5 Drawing Figs.

[52] U.S. Cl. .................................................. 119/5,
261/121
[51] Int. Cl. .................................................. A01k 64/00
[50] Field of Search .......................................... 119/3, 5;
261/121, 122; 43/57; 46/92; 248/46; 108/150

[56] References Cited
UNITED STATES PATENTS

| 2,189,687 | 2/1940 | Thomas | 248/46 |
| 2,655,331 | 10/1953 | Merritt | 248/46 |
| 2,732,341 | 1/1956 | Huff | 119/5X |
| 3,232,271 | 1/1966 | De Jose et al. | 119/5 |
| 3,279,730 | 10/1966 | Holmes | 248/46 |

Primary Examiner—Aldrich F. Medbery
Attorney—Friedman & Goodman

ABSTRACT: A standing base for an aquarium ornament, such as is used to hold an air supply conduit in a submerged condition, wherein the housing thereof forming the compartment for accommodating the air supply conduit has a pivotally mounted cover which when moved transversely of the housing effectively holds the ornament upright in its submerged condition.

PATENTED DEC22 1970 3,548,786

INVENTOR.
ALLAN H. WILLINGER

BY Freedman & Goodman
Attorneys

AQUARIUM WATER WHEEL

The present invention relates generally to an aquarium ornament such as is used both to increase the display value of the aquarium and also to hold the air supply conduit in a submerged condition, and more particularly to an improved standing base for an aquarium ornament.

As generally understood, there is a constant need to enrich the oxygen content of the water of an aquarium, as by continuously pumping and bubbling air through the water. This obviously necessitates maintaining the remote or free end of the air pump conduit in a submerged condition within the aquarium and is usually achieved by attaching this conduit end to an aquarium ornament. Also as generally understood, the ornament is desirably either provided with an appearance of some object having an association with marine life, such as for example an underwater sea diver, or it may have some movement which adds to the display value of the aquarium, such as for example a rotatable water wheel as in the present case. With a rotating wheel it is necessary to maintain the upright position of the ornament so as not to restrict its rotative movement and also to keep the ornament in a submerged, designated location despite this rotative movement. Presently known water wheel aquarium ornaments achieve these two functions with different structure which invariably adds to their production cost.

Broadly, it is an object of the present invention to provide an improved aquarium ornament overcoming the foregoing and other shortcomings of the prior art. Specifically, it is an object to provide an aquarium ornament having an improved standing base effectively containing the air pump conduit as well as maintaining the upright position of the ornament.

A preferred embodiment of an aquarium ornament demonstrating objects and advantages of the present invention includes a water wheel journaled for rotation between supports engaged to a hollow housing which accommodates the air pump conduit, the housing having a pivotally mounted cover which when moved into a crossing relation to the housing serves as a standing base for the ornament. The extending extremities of the cover are also advantageously placed under weight to maintain the submerged condition of the ornament.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
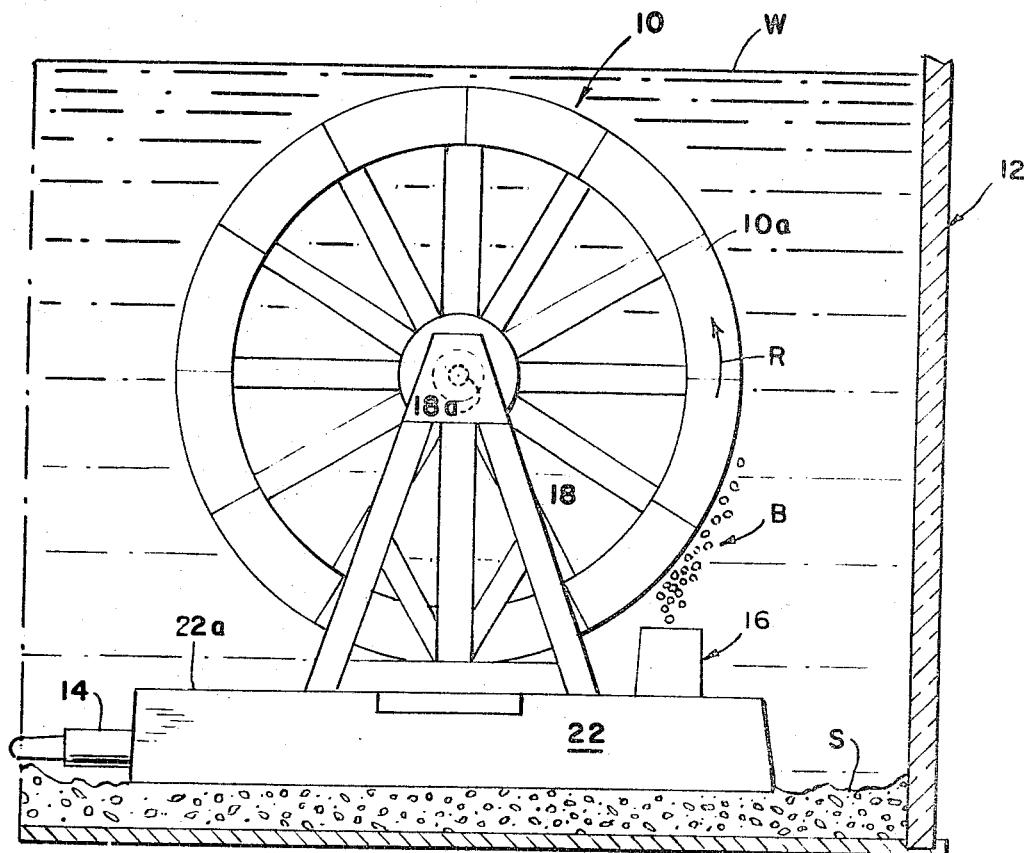
FIG. 1 is a partial elevational view of an aquarium ornament, specifically a water wheel, in its operative position within an aquarium tank, portions of the illustrated structure being in section to better illustrate the structural features thereof.

Reference is now made to the drawings wherein there is shown an aquarium water wheel, generally designated 10, demonstrating objects and advantages of the present invention. As clearly shown in FIG. 1, the aquarium ornament 10 is specifically in the form of a water wheel and has an operative submerged position in a water body W of an aquarium tank 12. As generally understood, the water wheel ornament 10 is therefore capable of being advantageously used in the aeration of the water body W. More particularly, ornament 10 is operatively associated with a conduit 14 connected at an end not shown to an air pump and, at its other end, to the ornament 10 such that air pumped through the conduit 14 is released in the form of bubbles B from an air release outlet 16 of the ornament 10. To this end, the air release outlet 16 is strategically located in alignment with the rotatably mounted water wheel 10a of the ornament such that the released bubbles B in floating up to the surface of the water body W are effective in causing rotation, in the direction R, of the water wheel 10a. This, in an obvious manner, contributes to the display value of the aquarium as well as permits the introduction of air bubbles B into the water body W such as is necessary, for reasons which are well understood, to promote proper conditions for maintaining the aquarium.

As illustrated in FIG. 1, the aquarium ornament 10, when in use, has an upright standing position on a layer of sand S, or similar material, spread over the tank bottom wall 12a, and it is this submerged, operative position which the aquarium ornament 10 is required to maintain throughout its operation. In accordance with the present invention, this is achieved using a novel standing base which will soon be described.

Figure 2:
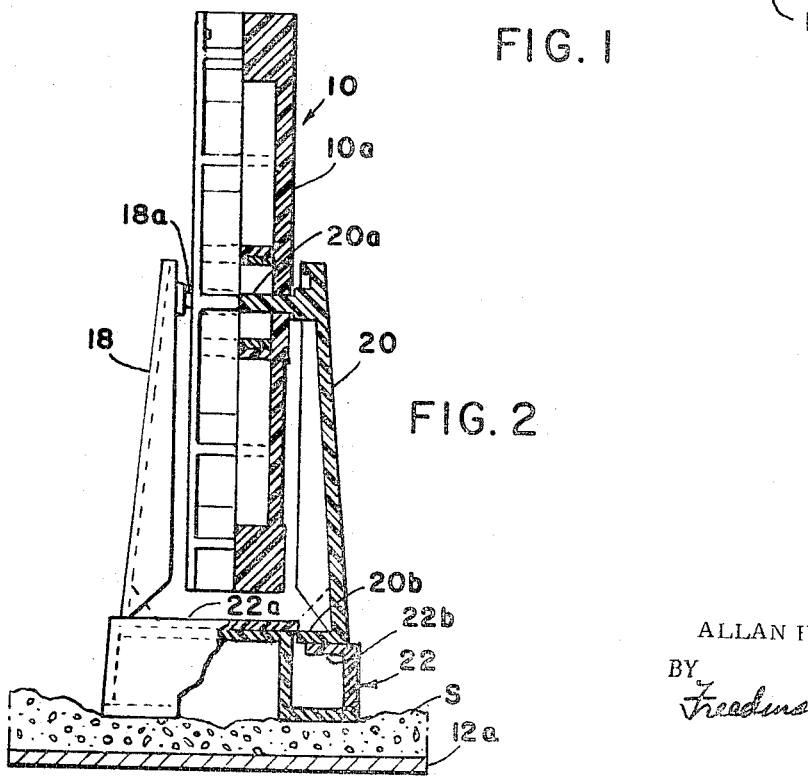
FIG. 2 is a side elevational view of the water wheel, one-half of which is shown in longitudinal section to better illustrate the construction thereof.
Figure 3:
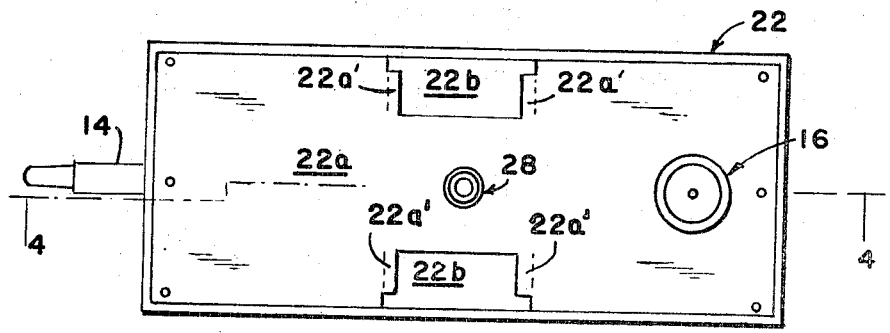
FIG. 3 is an isolated top plan view of the housing on which the water wheel is journaled for rotation.
Figure 5:
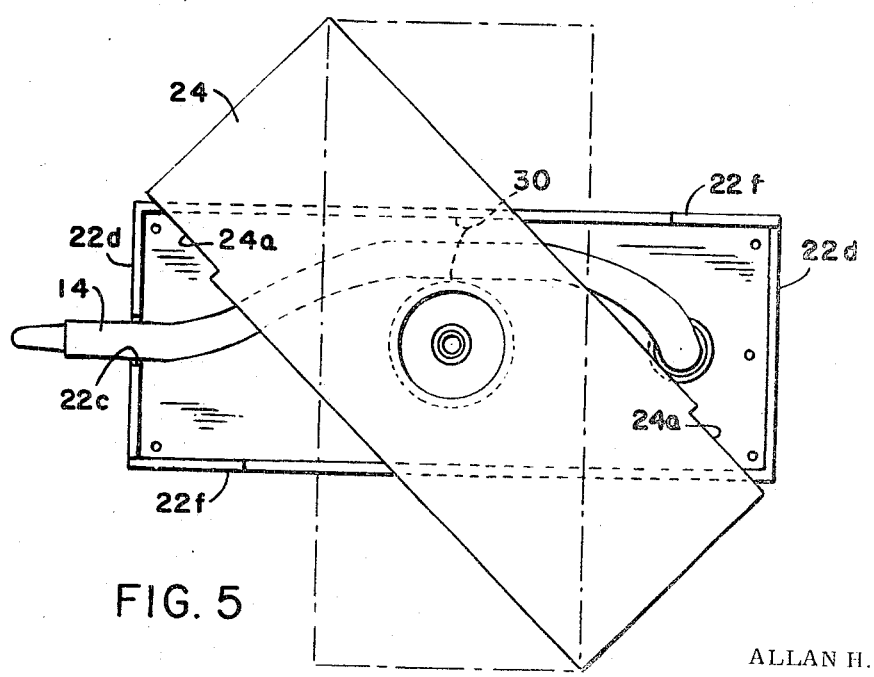
FIG. 5 is a bottom plan view, similar to FIG. 3, but illustrating positions of movement of the housing cover in full line and phantom line perspective.

First, however, it should be understood that the ornament 10, in its preferred illustrated form, includes, as already noted, a water wheel 10a rotatably supported on upstanding supports 18 and 20. These supports present laterally extending trunnions 18a, 20a which are projected from opposite sides into an axial opening in the water wheel 10a to thereby appropriately journal the wheel for rotation. Each of the supports 18, 20, respectively, also has a laterally extending mounting ledge at its lower end, only ledge 20b of the support 20 being shown in FIG. 2, which ledge is slidably inserted in an accommodating notch in a lower housing 22 of the ornament 10. More particularly, as shown in FIG. 3, in the housing upper wall 22a, and more particularly on opposite sides of the central portion thereof, there is a wall section 22b which is located slightly below the upper wall 22a so as to cooperate with edges 22a' thereof which extend over the wall 22b to define a ledge-accommodating slot in which the ledge 20b of the support 20 is slidably accommodated. Similarly, an equivalent ledge on the support 18 is accommodated in the opposite housing slot. In this manner, each support 18, 20 is slidably engaged to extend in an upstanding orientation from the housing 22. It is preferable during the achievement of this sliding engagement that the trunnions 18a, 20a are projected into the axial opening of the water wheel 10a so that the water wheel 10a is journaled for rotation on these trunnions Also as already noted, upper housing wall 22a has integrally molded therein an upstanding, hollow air release outlet 16 which internally has a depending cylindrical section 16a which is adapted, in practice, to accommodate in a force fit thereon the outlet opening of the air pump conduit 14. Spaced from this connection, as illustrated in FIG. 5, the air pump conduit 14 is disposed through an opening 22c in the remote sidewall 22d of the housing 22. Completing the construction of the outlet 16 is a small diameter exit opening 16b in the upper portion thereof which is effective in breaking the air stream flowing through the conduit 14 into discreet, numerous bubbles B.

From the foregoing description, it should be appreciated that the housing 22, including the previously noted upper wall 22a and the four-sidewalls, individually and collectively designated herein 22d, thus cooperate to bound an internal storage compartment 22e through which, as already noted, the air pump conduit 14 is operatively disposed in effectuating its connection to the air release outlet 16. In accordance with the present invention, storage compartment 22e has a pivotally mounted bottom cover 24 which, as will now be described, cooperates in its laterally extending positions of pivotal movement with respect to the housing 22 to provide a standing base for the aquarium ornament 10. Specifically, cover 24 will be understood to be essentially the same size and extent as the opening bounded by the body sidewalls 22d which form, in part, the storage compartment 22e. Cover 24 further includes an upstanding integrally molded hub 26 including side and upper walls 26a, 26b, respectively, the size of the sidewall 26a being such as to locate the upper wall 26b adjacent the housing upper wall 22a. Pivotal connection is then achieved between the cover 24 and housing upper wall 22a using a rivet 28 installed in a conventional manner, namely, by being inserted through aligned openings in the wall 22a and hub wall 26b and then having its opposite ends swaged to prevent removal.

Figure 4:
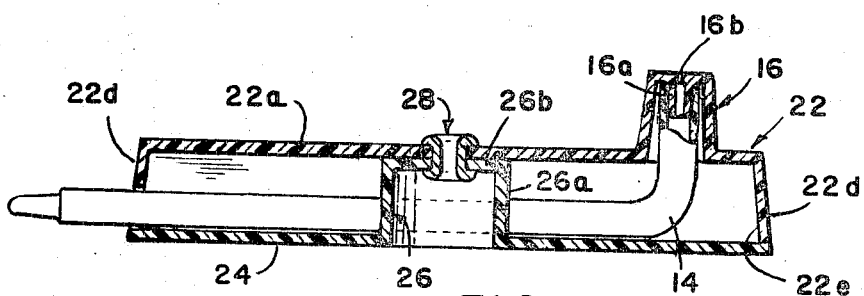
FIG. 4 is a side elevational view of the housing, taken in section on line 4-4 of FIG. 3, illustrating further structural features thereof.

As may be best understood by a comparison of FIGS. 4, 5, by virtue of the rivet connection 28 between the cover hub 26 and the housing upper wall 22a, cover 24 is movable through a range of positions of movement relative to the housing 22, one such position being a position in alignment with the opening of the housing 22, another being a partially open position such as is illustrated in full line in FIG. 5, and still another significant position being a completely open position extending transversely of the housing 22 as illustrated in phantom perspective in FIG. 5. In the last named position, the cover 24 best cooperates with the housing 22 to form a crisscross stand which is effective, in an obvious manner, to function as a standing base for the aquarium ornament 10. At this time, sand S may advantageously be placed as weight on the extremities of the cover 24 to help in holding the ornament in its submerged position. While functioning as a standing base, it should be noted that the cover 24, the hub sidewall 26a and the upper housing wall 22a cooperate to define holding or surrounding structure 30 about the air pump conduit 14 to effectively hold this conduit in place within the storage compartment 22e. Completing the cover 24 is locking structure consisting of depending ledges 22f in opposite corners of the sidewalls of the housing 22 which cooperate with cover corner notches 24a to limit counterclockwise rotation of the cover 24 to the completely closed position of the cover 24 over the compartment 22e.

Thus, the housing 22 and its novel movably mounted cover 24 can be utilized as a standing base for an aquarium ornament, as exemplified by the water wheel 10a as illustrated herein, as well as for other shapes and forms of standing aquarium ornaments. In other respects as well it will be understood that a latitude of modification, change and substitution is intended in the foregoing disclosure and that in some instances some features of the invention will be employed without a corresponding use of other features. Accordingly, it is appropriate that the appended claims be construed broadly and in a manner consistent with the spirit and scope of the invention herein.

I claim:
1. An aquarium water wheel ornament comprising an elongated, rectangular housing bounding an internal compartment having a downwardly facing opening, a water wheel, a pair of upstanding supports engaged adjacent their lower ends with said housing and adjacent their upper ends with said water wheel so as to rotatably mount said water wheel on said housing, an air release outlet in communication with said internal compartment located on said housing in alignment with the periphery of said water wheel, an air pump conduit having an end operatively disposed in said internal compartment and connected to said air release outlet, and a bottom cover operatively arranged in said opening of said internal compartment for movement between a position aligned with said housing and a position oriented transversely thereof, whereby said cover in said transversely oriented position and said housing cooperate to define a standing base for said water wheel and wherein said cover has an upstanding centrally located hub having an upper horizontally oriented wall and a sidewall, said interconnection between said housing and cover being effected through said hub upper wall such that said hub sidewall, said cover and said housing cooperate to define holding structure surrounding said air pump conduit.

2. An aquarium ornament as defined in claim 1 wherein said supports are slidably engageable to said housing and have trunnions at their respective upper ends on which said water wheel is journaled for rotation.

3. An aquarium ornament comprising an elongated, rectangular housing bounding an internal compartment having a downwardly facing opening and a bottom cover operatively arranged in said opening for movement between a position aligned with said housing and a position oriented transversely thereof, whereby said cover in said transversely oriented position and said housing cooperate to define a standing base for said aquarium ornament, said base including an air release outlet on said housing in communication with said internal compartment, an air pump conduit having an end operatively disposed in said internal compartment and connected to said air release outlet, and wherein said cover has an upstanding centrally located hub having an upper horizontally oriented wall and a sidewall, said interconnection between said housing and cover being effected through said hub upper wall such that said hub sidewall, said cover and said housing cooperate to define holding structure surrounding said air pump conduit.